Aug. 4, 1936.                W. J. PASINSKI                2,050,065
                              CASH MACHINE
                         Filed Sept. 15, 1933        4 Sheets-Sheet 1
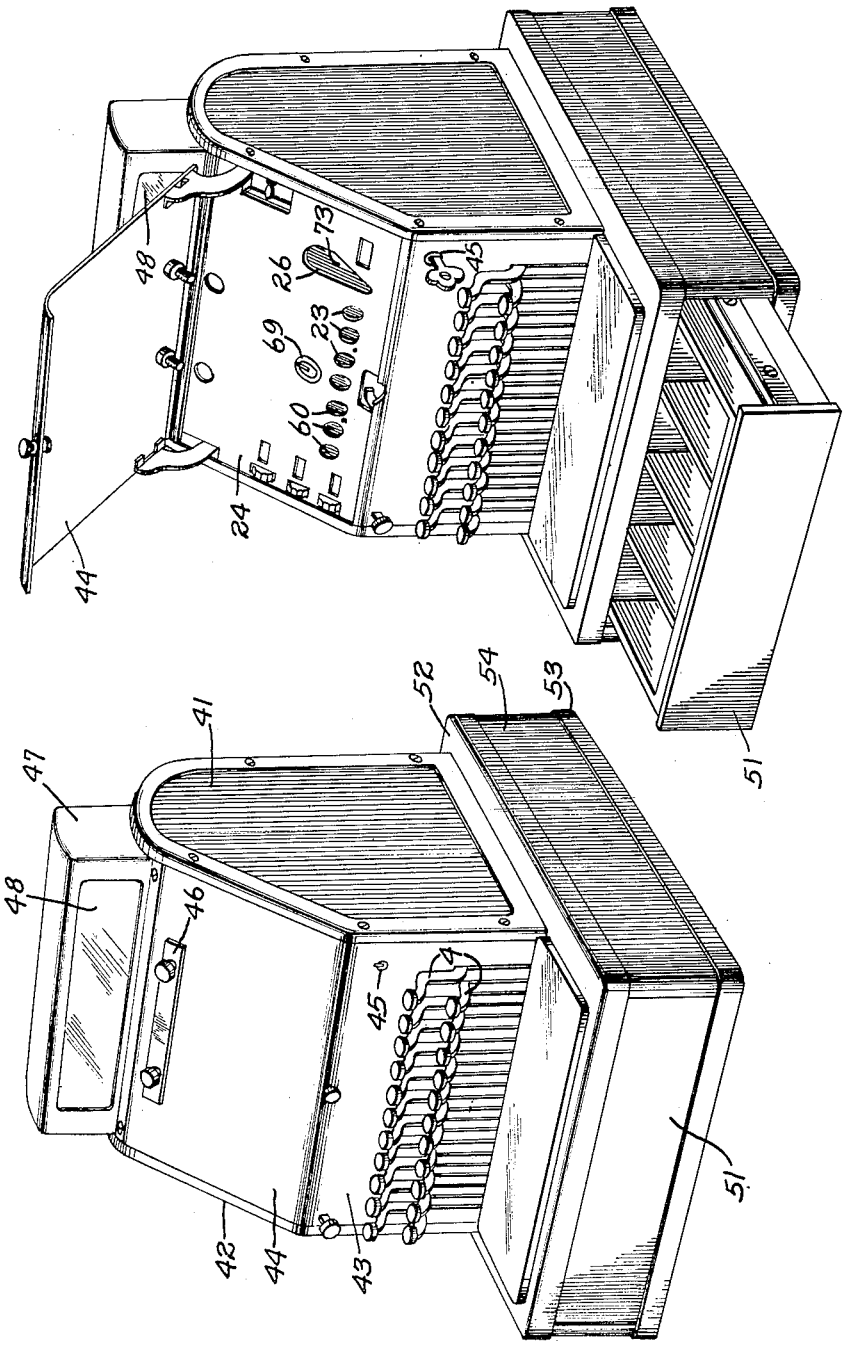
INVENTOR
Walter J. Pasinski
BY
Rector, Hibben, Davis & Macauley
ATTORNEYS

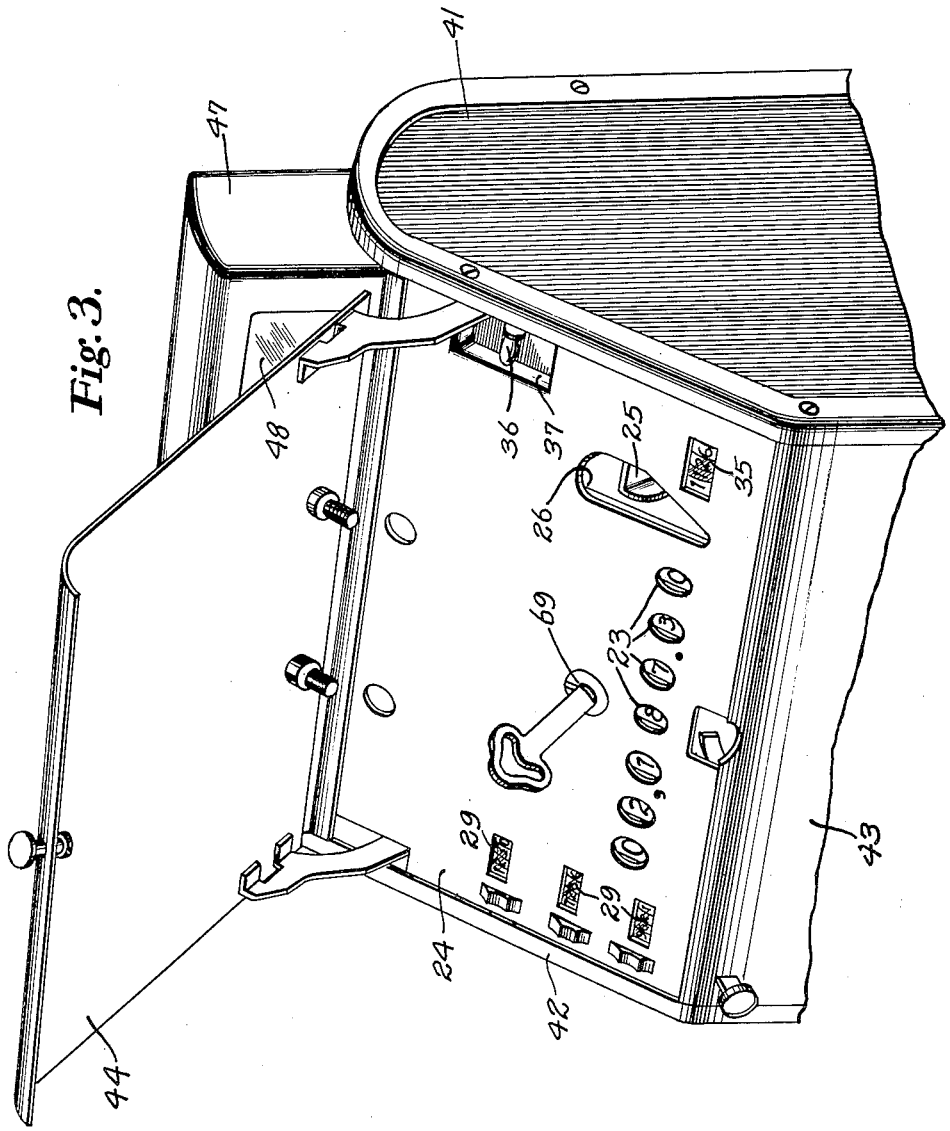

Aug. 4, 1936.  W. J. PASINSKI  2,050,065
CASH MACHINE
Filed Sept. 15, 1933  4 Sheets-Sheet 4
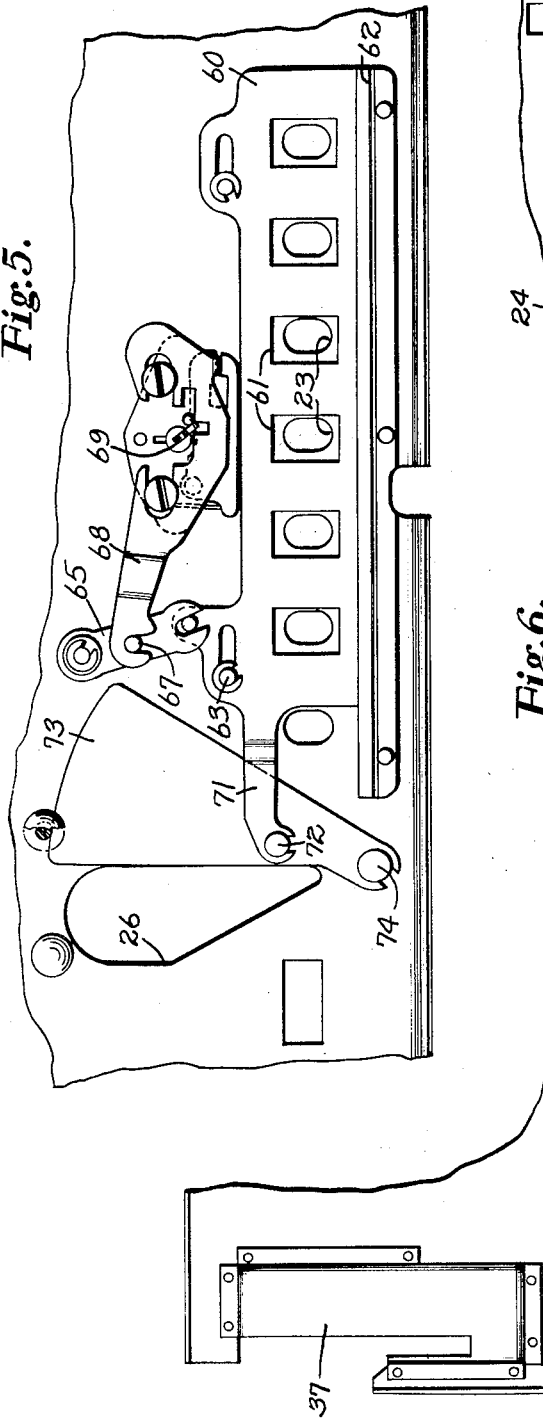
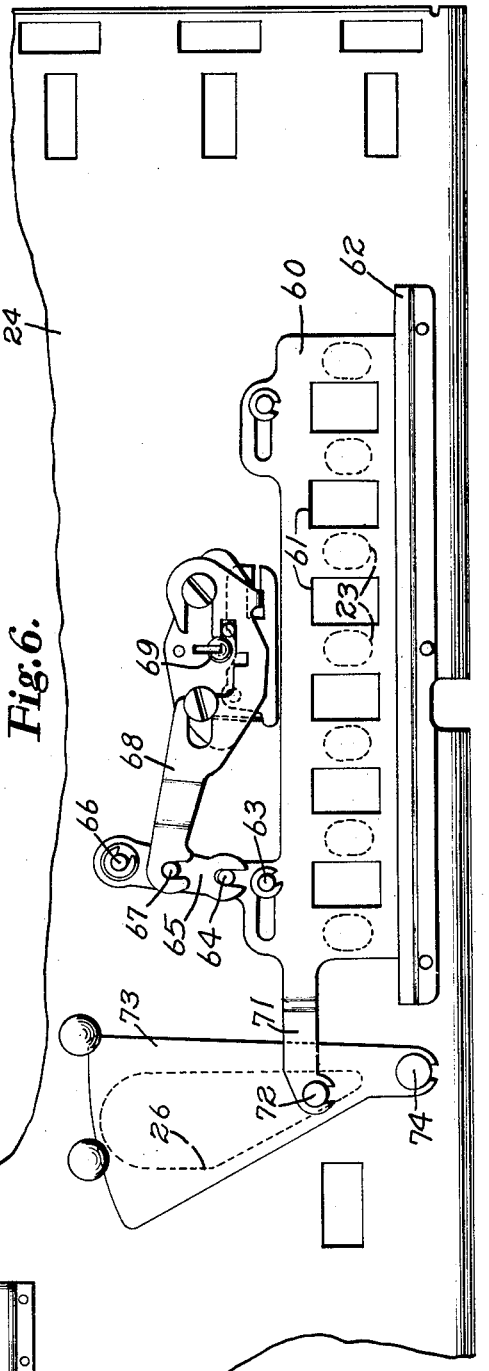
INVENTOR
Walter J. Pasinski
BY
Rector, Hibben, Davis & Macauley
ATTORNEYS Patented Aug. 4, 1936

2,050,065

UNITED STATES PATENT OFFICE 2,050,065

CASH MACHINE

Walter J. Pasinski, Howell, Mich., assignor to Burroughs Adding Machine Company, Detroit, Mich., a corporation of Michigan Application September 15, 1933, Serial No. 689,660

2 Claims. (Cl. 235—24)

This invention relates to cash machines and is more particularly concerned with obscuring and locking the totalizing register its reset lever and/or one or more of the controls and counters associated with the cash machine.

Cash machines are provided with an accumulating or totalizing register which registers and indicates the total of the amounts entered into the machine. This register is resettable to zero position and is usually zeroized at the end of the day's work. Cash machines are also usually provided with item counters which count the various types of transactions performed in the cash machines such as the no-sale transactions, the cash transactions and/or paid-out transactions. One or more control levers are usually provided for controlling the cash machine such as enforcing closing of the drawer at each key depression or nullifying this enforcement and/or to lock the machine in its entirety.

The registers, counters, and controls are usually concealed and locked but are accessible by raising a hinged casing panel or cover which cover is usually under control of a lock and key, the latter of which is retained by the store manager or proprietor. In many instances, however, it is desirable to permit certain clerks, supervisors, or managers to have access to one or more counters and/or controls to permit him to vary the operation of the machine during rush hours or to take sub-readings of the number of transactions performed by the machine. On the other hand it is desirable to retain control both as to vision and operation of the totalizing register and its zeroizing means in the hands of one person, such as a manager or proprietor.

It is therefore an object of this invention to provide an improved obscuring and locking means for one or more of the controls or registers of a cash register.

It is a further object of this invention to provide independent controls for one or more of the counters, control elements and/or registers of a cash machine or register.

It is a further object of this invention to provide a novel obscuring and locking means for the totalizing register and zeroizing lever therefor.

It is still another object of this invention to provide an obscure means which enforces proper conditioning of the machine prior to operation thereof.

Further objects and advantages will be apparent from the following description and in connection with the drawings in which:

Figure 1 is a perspective view from the front of the cash register or machine with the hinged lid closed and before a key has been depressed;

Fig. 2 is a similar perspective showing the hinged lid raised and the cash drawer open, but with the obscuring means for the totalizing register and reset lever active to prevent access thereto;

Fig. 3 is a perspective view of the upper portion of the machine with hinged lid open and with the securing means open or inactive permitting vision of the totalizing register wheels and the reset lever;

Fig. 5 is a view from the underside of the totalizing register obscuring plate and the cover plate showing the obscuring plate in open position; and Fig. 6 is a similar view showing the obscuring plate in closed position.

Cash machine mechanism

Figure 4:
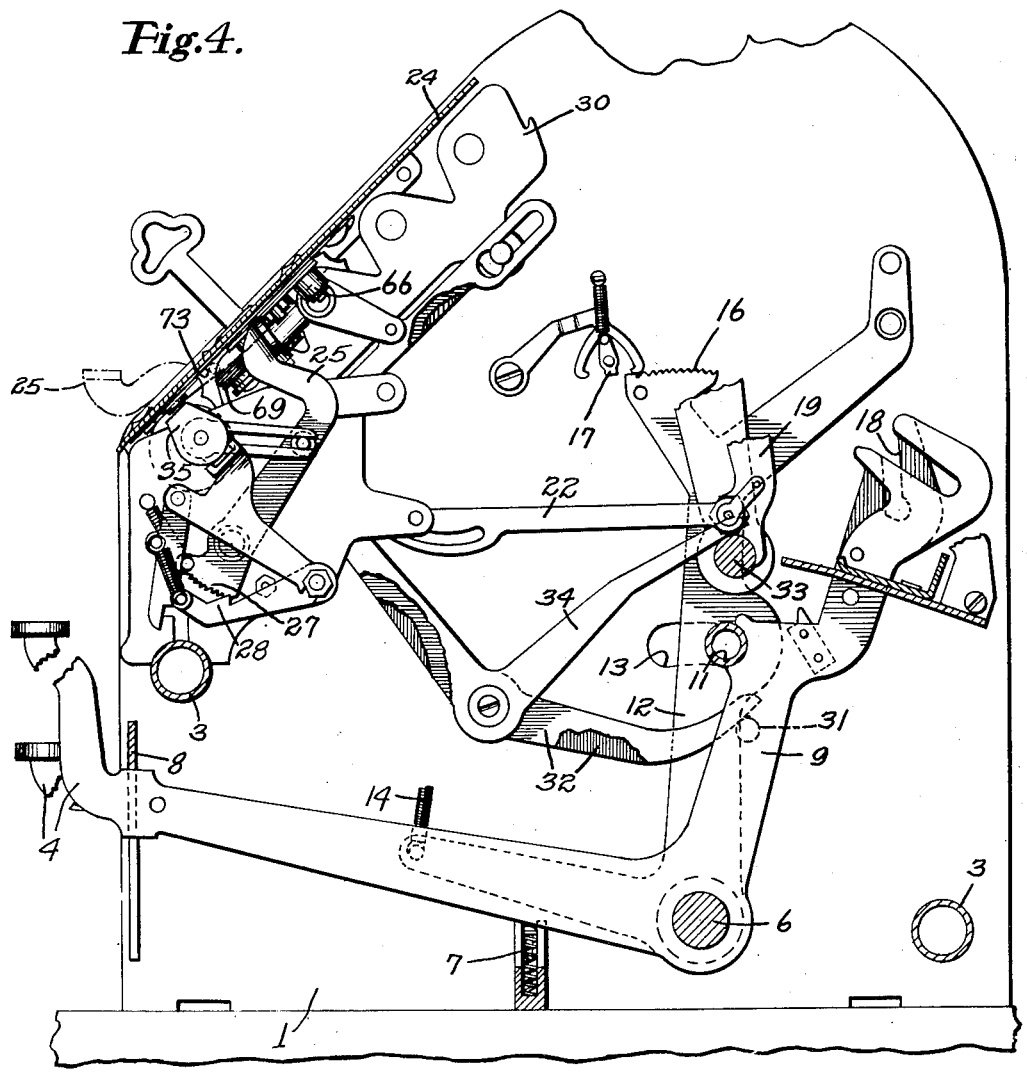
Fig. 4 is a side sectional elevation of the machine illustrating the totalizing register, reset lever, item counters and certain of the general cash register operating mechanisms.

The cash machine operating mechanism is no part of this invention, being the subject matter of my co-pending application, Serial No. 689,656 filed September 15, 1933 but will be briefly described in order to better comprehend this invention.

The cash machine mechanisms instead of being mounted within a cast frame are mounted and carried between right and left side plates 1 which support the entire mechanism and are maintained in spaced relation by tubular members 3 and by various shafts of the cash machine mechanism. This construction not only facilitates assembly, inspection and repair of the machine, but reduces weight and also cost of production.

The cash machine mechanism includes two rows of depressible keys 4 of the necessary denomination and numbers in each denomination. The keys are journaled on a cross shaft 6 secured to end plates 1 and are urged clockwise about shaft 6 by spring 7, the movement of the keys being limited by cross bar 8. Each key has rearwardly and upwardly extending arms 9 which engage a hollow cross shaft 11 carried at each end by one arm of a full stroke lever 12 secured to shaft 6 adjacent each end thereof. Shaft 11 extends through slots 13 in the end plates which slots limit the rocking movement of the shaft 11 and levers 12 comprising a universal bail. Levers 12 and consequently the universal bail are constantly urged clockwise by springs 14. The full stroke levers 12 terminate in their upper ends in sectors 16 engaged by pawls 17 which insure a full stroke being made each time levers 12 are oscillated.

The upper end of each key lever has a differential cam slot 18 therein which actuates a bail (not shown) which in turn differentially oscillates a lever 19 which in turn indexes the indicating mechanism (not shown) and also one or more totalizing or accumulating registers 21 through connecting links 22. The indicator wheels of the accumulating registers are visible through a series of apertures 23 in a cover plate 24 overlying the register. The registers may be cleared or zeroized by operation of a lever 25 which normally lies beneath a plate 24 but projects through an opening 26 therein when actuated. The zeroizing lever 25 is provided at its lower end with a full stroke rack 27 which, with an associated pawl 28, enforces a full stroke being taken of the zeroizing lever prior to return thereof.

*Item counters*

The machine as illustrated is provided with three item counters 29 having the usual indicator wheels and mounted upon a frame 30 two of which are actuated from rollers 31 carried by character keys such as the no-sale and paid-out keys through levers 32 and the third of which is actuated from the restoring bail 33 which is rocked at each machine operation and engages an arm 34 connected to the third counter. A fourth counter 35 having indicator wheels counts the number of times the accumulating register is cleared as will be explained later. All counters are visible through apertures formed in plate 24, as can be seen from Fig. 3.

*Operating control*

The machine is also provided with a control lever 36 which projects into a depression 37 formed in plate 24 so as to be operable from the top of the machine after the hinged cover, later to be described, is raised. This control lever operates and controls the machine through suitable mechanism shown, described and claimed in my co-pending application Serial No. 689,661 filed September 15, 1933, and is adjustable to three positions, one for locking the machine entirely, one for enforcing closing of the drawer at each transaction of the machine prior to a succeeding entry, and third to a position which permits the machine to be operated independently of the position of the cash drawer.

*Casing*

The entire cash register mechanism is enclosed in a sectionalized casing secured to the side frames 1 and comprises two side plates 41 and 42 which are similar except that one is for the right side and one is for the left side, a lower front panel 43, an upper hinged front panel 44 to which a bar 46 is secured for fastening a memorandum pad to the panel, a removable indicator housing 47 having the usual front and rear glasses 48, and a rear panel 49 which completes the enclosure for the cash register mechanism. The hinged front panel 44 lies immediately above, parallel to, and in close proximity to plate 24, and may be secured or locked in closed position by a key lock 45, the cylinder of which projects through the upper right hand corner of the lower front panel 43.

The cash machine mechanism is mounted on top of the cash drawer 51 enclosed within a cash drawer housing comprising a top flanged plate 52, and a bottom flanged plate 53 between which is secured a U-shaped side wall member 54. The casing structure and drawer housing are not described in detail, being the subject matter of my co-pending application, Serial No. 689,662, filed September 15, 1933, to which reference is made for further details if necessary.

Opening of hinged lid 44 actuates a suitable control to open cash drawer 51 and locks the keys against depression so that the machine cannot be operated or so that the cash can be counted while the drawer is open without further manipulation of the machine and the machine cannot be operated until at least the lid 44 is returned to closed position, all as disclosed in my co-pending application Serial No. 689,662, filed September 15, 1933.

*Obscuring means*

The hinged cover 44 when closed obscures and conceals all the indicating means such as the item counters, the totalizing register wheels, and also the control lever. Inasmuch as the control lever 36 may be set so as to lock the machine and the hinged cover 44 may be locked by a lock 45, it is possible for a manager, by retaining the key to lock 45, to maintain exclusive control over the cash machine.

It is frequently desirable, however, to delegate an assistant manager or some one in supervisory authority to have partial control over the cash machine, i. e., for example, to give him access to the control lever 36, during rush periods to change the operation of the machine and to certain indicators so as to be able to read the counters to record the number of operations of certain transactions during certain periods or shifts of the day, while maintaining exclusive authority and control over the totalizing registers in the manager or proprietor. For this purpose the register wheels and the zeroizing lever are placed under an independent securing and locking means.

For this purpose an obscuring plate or slide 60 is provided which is selectively movable either to obscure the register wheels or to permit observation thereof, the slide being under control of a lock and key as will now be explained.

Slide 60 is provided with a series of apertures 61 which, when the slide is in one position coincide with the apertures 23 in plate 24 to permit vision of the register indicator wheels therebeneath and when in another position close apertures 23 to obscure the register dials. Plate 60 is mounted for sliding movement on the underside of plate 24 by means of a guide rail 62 and studs 63. Adjacent one end slide 60 carries a pin 64 which engages the forked end of a layer 65 pivoted to plate 24 at its other end 66. Intermediate its end lever 65 carries a stud 67 which is engaged by the hooked end of a slide 68 controlled and actuated by a key lock 69, the cylinder of which projects through one side of plate 24 and contains one slot only requiring that the key be turned to locked position for extraction thereof for reasons which will later appear. By rotation of the key in lock 69, slide 68 may be reciprocated horizontally to rock lever 65 about its pivot and reciprocate slide 60 to either of its two positions.

Slide 60 is provided with a finger 71 at one end to which is connected a stud 72 projecting from the underside of a shutter 73 pivoted to plate 24 at 74 in position to obscure the aperture 26 through which zeroizing lever 25 must project when zeroizing or clearing the register. The connection is such that when slide 60 is in position to obscure apertures 23 the opening 26 will also be closed by shutter 73 and vice versa when slide 60 is in position to permit observation of the register dial, shutter 73 will be moved to uncover aperture 26. There is therefore an independent obscuring means for certain of the indicating means and controls, i. e., the register wheels and reset lever.

Projection of zeroizing lever 25 through the aperture 26 in plate 24 prevents closing of the hinged cover 44 and therefore prevents the operation of the machine until the forward stroke of the zeroizing lever 25 has been completed which is necessitated by the rack and pawl and returned below the surface of plate 24.

The same is true with regard to the key for operating lock 69. When this key is in position the projecting end thereof will also prevent closing of the hinged cover 24 and it will be recalled that key for lock 69 can only be withdrawn after it is turned to locked position due to the fact that its lugs will not be in line with the single slot in the cylinder at any other position.

It will be apparent from the foregoing therefore that not only is it necessary to take a full stroke of the reset lever for the registers and permit its return below the surface of plate 24 before operation of the machine can be resumed, but it is also necessary to turn the key in lock 69 to move slide 60 and shutter 73 to closed or obscuring position, before lid 44 can be closed and before operation of the machine may be resumed.

From the foregoing description it will be apparent that by the independent but associated use of the hinged cover 44, the inner plate 24 with its obscuring slide 60 and shutter 73, the hinged cover and the shutter being independently controlled by individual locks, that all of the operations, counters and registers are under control of a lock and key. Furthermore, access to certain controls and counters may be delegated to one or more authorized persons while the final control of the register wheels may be retained in the hands of the manager or proprietor. In other words, an assistant manager having the key to the upper hinged cover 44 may make a record of the number of transactions of various kinds made during the course of a selected number of hours and may control the operation of the machine to suit the conditions at different periods whereas he is restricted from observing and setting the main totalizing register wheels. This control being retained by lock 69, the key to which may be held by the manager or any other authorized person independently of any one who may have a key to lock 45 permitting raising of the hinged cover 44.

It will be apparent to those skilled in the art that while the invention has been illustrated as applied to a specific type of cash register its principles and illustrated structure are applicable to other types of machines and that minor changes may be made in the details of construction without departing from the spirit and scope of this invention as defined in the appended claims.

I claim:

1. In a cash machine, a resetting element, an accumulating register having indicating elements, a case enclosing said machine and having a hinged panel overlying all of said elements and movable from open to closed position in which latter position it obscures all of said elements, a lock for securing said hinged panel in closed position, an additional obscuring means comprising an apertured plate through which said elements may be observed, and a combined slide and shutter mechanism for closing the apertures in said plate and movable from open to closed position in which latter position the mechanism obscures said indicating and resetting elements, said resetting element being operable through one of said apertures in said plate when said mechanism is in its open position and preventing closing of said combined slide and shutter mechanism when in its operative position, and a lock for operating said combined slide and shutter mechanism, said lock being obscured by said hinged panel when the latter is in closed position.

2. In a cash machine, a resetting element, an accumulating register having indicating elements, a casing enclosing said machine and having a hinged panel overlying all of said elements and movable from open to closed position in which latter position it obscures all of said elements, a lock for securing said hinged panel in closed position, an apertured plate underlying said hinged panel and through which said elements may be observed, a slide for closing the apertures for the indicating elements, a pivoted shutter connected to said slide for movement therewith and operable to close the aperture for the resetting element, said resetting element being operable through its aperture in said plate when the slide and shutter are in their open positions and preventing closing of said slide and said shutter and closing of said hinged panel when in operative position, and a lock for operating the slide and shutter, said lock being obscured by said hinged panel when the latter is in closed position.

WALTER J. PASINSKI.